United States Patent
Guy

(10) Patent No.: US 11,719,020 B2
(45) Date of Patent: Aug. 8, 2023

(54) FAST ACTING ELECTRO-MECHANICAL UNLOCKING DEVICE

(71) Applicant: Safran Cabin Inc., Huntington Beach, CA (US)

(72) Inventor: Fred Guy, Huntington Beach, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 333 days.

(21) Appl. No.: 17/322,070

(22) Filed: May 17, 2021

(65) Prior Publication Data

US 2022/0364388 A1 Nov. 17, 2022

(51) Int. Cl.
| | |
|---|---|
| E05B 47/00 | (2006.01) |
| E05B 83/42 | (2014.01) |
| H01F 7/06 | (2006.01) |
| H01F 7/08 | (2006.01) |
| B64C 1/14 | (2006.01) |

(52) U.S. Cl.
CPC .......... *E05B 47/0006* (2013.01); *E05B 83/42* (2013.01); *H01F 7/064* (2013.01); *H01F 7/081* (2013.01); *B64C 1/1407* (2013.01); *E05B 2047/0076* (2013.01)

(58) Field of Classification Search
CPC ................ E05B 47/0006; E05B 83/42; E05B 2047/0076; H01F 7/064; H01F 7/081; B64C 1/1407
See application file for complete search history.

(56) References Cited

U.S. PATENT DOCUMENTS

| | | | | |
|---|---|---|---|---|
| 4,986,584 | A | * | 1/1991 | Logas ................. E05B 47/0047 292/201 |
| 6,139,073 | A | * | 10/2000 | Heffner ................... E05B 83/40 292/201 |
| 6,745,982 | B2 | | 6/2004 | Lehman |
| 6,866,226 | B2 | | 3/2005 | Pratt |
| 6,866,227 | B2 | | 3/2005 | Pratt |
| 7,032,863 | B1 | * | 4/2006 | Piorkowski ......... E05B 47/0047 244/129.4 |

(Continued)

FOREIGN PATENT DOCUMENTS

EP 0 121 517 B1 3/1988

OTHER PUBLICATIONS

Extended European Search Report issued in EP 22173441.1.

*Primary Examiner* — Mark A Williams
(74) *Attorney, Agent, or Firm* — Jeffer Mangels Butler & Mitchell LLP; Brennan C. Swain, Esq.

(57) ABSTRACT

An electro-mechanical unlocking device that includes a locking state, a holding state and an unlocking state. The unlocking device includes an arming solenoid and a holding solenoid. In the locking state the arming solenoid moves an arming assembly, which moves a crank and which moves a holding armature from a second position to a first position. In the holding state the holding solenoid is energized and the arming solenoid is de-energizing, which allows the arming armature to moves from the first position to the second position. In the unlocking state the holding solenoid is de-energized, which allows the holding armature and the arming link to move from the first position to the second position. In the locking and holding states a sear blocks the path of the striker and in the unlocking state the sear does not block the path of the striker.

9 Claims, 7 Drawing Sheets

(56) References Cited

U.S. PATENT DOCUMENTS

| | | | |
|---|---|---|---|
| 7,578,475 B2 | 8/2009 | Pratt | |
| 8,919,829 B2 * | 12/2014 | Hernandez | E05B 51/023 |
| | | | 292/228 |
| 10,301,846 B2 * | 5/2019 | Macaraeg, Jr. | E05C 3/02 |
| 11,566,459 B1 * | 1/2023 | Lawrence | E05D 3/14 |
| 2006/0102788 A1 * | 5/2006 | Piorkowski | B64C 1/1469 |
| | | | 244/129.4 |
| 2013/0333426 A1 * | 12/2013 | Baker | E05B 47/0012 |
| | | | 292/220 |
| 2016/0340040 A1 * | 11/2016 | Pfeiffer | E05C 19/16 |
| 2018/0017179 A1 * | 1/2018 | Robertson | H01F 7/064 |
| 2019/0309548 A1 * | 10/2019 | LaConte | E05B 81/08 |
| 2021/0262255 A1 * | 8/2021 | Blum | B64C 1/1407 |
| 2022/0381069 A1 * | 12/2022 | Martin | B64C 1/1423 |

\* cited by examiner

FAST ACTING ELECTRO-MECHANICAL UNLOCKING DEVICE

FIELD OF THE INVENTION

The present invention relates generally to a fast acting electro-mechanical unlocking device, and more particularly to a fast acting electro-mechanical unlocking device that can be used in a decompression event in an aircraft.

BACKGROUND OF THE INVENTION

Within aircraft cabins there exist a number of chambers that are separated by panels, doors, access panels, barriers and the like. Passenger cabins are pressurized (relative to the outside atmosphere) in order to maintain an acceptable environment for passengers. Should a decompression event occur, the chamber that decompresses rapidly drops pressure, causing the adjacent chambers to apply pressure to the barrier that it separates.

In order to equalize the pressure across the barrier between the decompressed and adjacent chambers, a means of releasing movable doors or panels is required to ensure that the structural integrity of the aircraft is maintained. The pressure that can be presented to the barrier can be significant. A means of unlocking is required that would withstand this significant resultant load, and, release in a very short period of time, enabling the pressure to equalize either side of the barrier in adjacent chambers.

Current devices that exist to satisfy the design parameters are either active or passive. Passive devices rely solely on pressure to be applied to a diaphragm (or similar). This moves a mechanism to release a hair trigger that unlocks the device. With these devices, the design cannot withstand significant load applied to the barrier wall (as is the case with a flight deck door on an aircraft that has to withstand an attempted intrusion), given the hair trigger nature of the design.

Active devices typically use electro-magnets to latch and hold the device in a locked state. This can result in either large electromagnets that have high power consumption, and as a result, are hot, heavy, and slow to react, or the need for significant stored energy to be retained, requiring secondary holding electromagnet(s) to maintain the device in a locked state, though to achieve a rapid release. These are typically troublesome given their very small degree of engagement (similar scenario to the passive device hair trigger), and their associated high precision. This then limits the significant load capability required for events such as intrusion of a flight deck door.

SUMMARY OF THE PREFERRED EMBODIMENTS

In accordance with an aspect of the present invention, there is provided an electro-mechanical unlocking device that includes a striker that is movable between a first position and a second position. The striker is configured to maintain a decompression panel in a normal position when the striker is in the first position. A sear that is movable between a first position and a second position. The sear is biased to the second position and maintains the striker in the first position when the sear is in the first position. An arming solenoid that includes an energized state and a non-energized state. An arming assembly that includes an arming armature and an arming link. The arming armature is movable between a first position and a second position. The arming link is movable between a first position and a second position. The arming armature is biased to the second position. A crank that is movable between a first position and a second position. The crank is biased to the second position. Movement of the arming link from the second position to the first position moves the crank from the second position to the first position. A holding solenoid that includes an energized state and a non-energized state. A holding armature that is movable from a first position to a second position. Movement of the crank from the second position to the first position compresses an unlock spring and moves the holding armature from the second position to the first position. The electro-mechanical unlocking device includes a locking sequence or state, a holding sequence or state and an unlocking sequence or state. In the locking sequence, the arming solenoid switches to the energized state. When the arming solenoid is switched to the energized state, the arming armature and arming link move together from the second position to the first position, the arming assembly moves the crank from the second position to the first position, the crank compresses the unlock spring, which moves the holding armature from the second position to the first position, the holding solenoid switches to the energized state and maintains the holding armature in the first position, and the crank moves the sear from the second position to the first position. The crank blocks movement of the striker from the first position to the second position. In the holding sequence, the arming solenoid switches to the de-energized state. When the arming solenoid switches to the de-energized state the arming armature moves from the first position to the second position, thereby opening a gap between a portion of the arming armature and a portion of the arming link. In the unlocking sequence, the holding solenoid switches to the de-energized state, when the holding solenoid switches to the de-energized state the holding armature moves from the first position to the second position, the unlock spring moves the crank from the first position to the second position, and the sear moves from the first position to the second position, thereby unblocking the striker.

In accordance with an aspect of the present invention, there is provided a method of actuating an electro-mechanical unlocking device. The method includes initiating a locking state by energizing an arming solenoid and moving an arming assembly from a second position to a first position. The arming assembly includes an arming link and an arming armature. When the arming solenoid moves the arming assembly from the second position to the first position, the arming link moves a crank from a second position to a first position, the crank moves a sear from a second position to a first position and a holding armature from a second position to a first position. The sear in the first position blocks movement of a striker from a first position to a second position. The method includes initiating a holding state by energizing a holding solenoid and de-energizing the arming solenoid. As a result, the arming armature moves from the first position to the second position and the arming link remains in the first position. The method includes initiating an unlocking state by de-energizing the holding solenoid. As a result, the holding armature moves from the first position to the second position, the crank moves from the first position to the second position, the arming link moves from the first position to the second position, and the sear moves from the first position to the second position, thus unblocking the movement path of the striker.

The present invention is designed to overcome the issues associated with existing designs discussed above by effectively decoupling the 'arming' and 'holding' of the stored energy required to achieve a fast release time. The device does this by realizing two separate functions: an arming function and a holding function. This is realized with two solenoids (one 'arming' and one 'holding'), and are decoupled via a mechanism. By separating these two functions with the decoupling mechanism, the stored energy required for a timely release can be applied by an arming solenoid (large force), and is separated, but held in place by a holding solenoid (small force).

In a preferred embodiment, there are three phases the device sees from locking to unlock: Locking, holding, and unlocking. In the locking phase, the arming solenoid energizes to translate the arming link upwards. This moves the crank into the vertical position. This also compresses the unlock spring, translating downwards, where, the holding magnet engages the holding armature. The sear is now blocked from rotating by the crank, and hence, the striker is blocked by the sear.

In the holding phase, the arming solenoid is de-energized once the lock position is confirmed. The arming armature translates back to its unpowered position via a light spring. This opens a gap within the arming link (this gap separates the arming armature mass from the unlocking action). The holding solenoid remains energized, holding the mechanism in the locked position.

In the unlocking phase (when a decompression event occurs or when a pilot or other aircraft personnel unlocks the mechanism to allow a person to enter the cockpit), the holding magnet is de-energized, thus releasing the holding armature. The unlock spring rotates the crank clockwise (as oriented in the figures). The crank unblocks the sear, the sear is sprung or biased to rotate and unblock the striker. The striker (or strike) then can be rotated (via pressure on the door in the case of a decompression event or a person pushing or pulling open the door), thus unlocking and assisting in the opening.

In an exemplary use, the striker acts as a locking mechanism for preventing the cockpit door from opening. As the door is closed, the latch bolt is pushed past the striker and the striker snaps back into position behind it much like a residential home door latch. With the solenoid striker assembly (SSA) de-energized the door can be opened again simply by pulling (or pushing) as force on the latch bolt can rotate the striker out of the way providing entry/exit. With the SSA energized however, the sear prevents the striker from rotating and the door is locked. It will be appreciated that in this exemplary use, the striker secures the bolt on the door latch.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. Furthermore, any particular feature, structure, or characteristic described herein may be optional.

Figure 1:
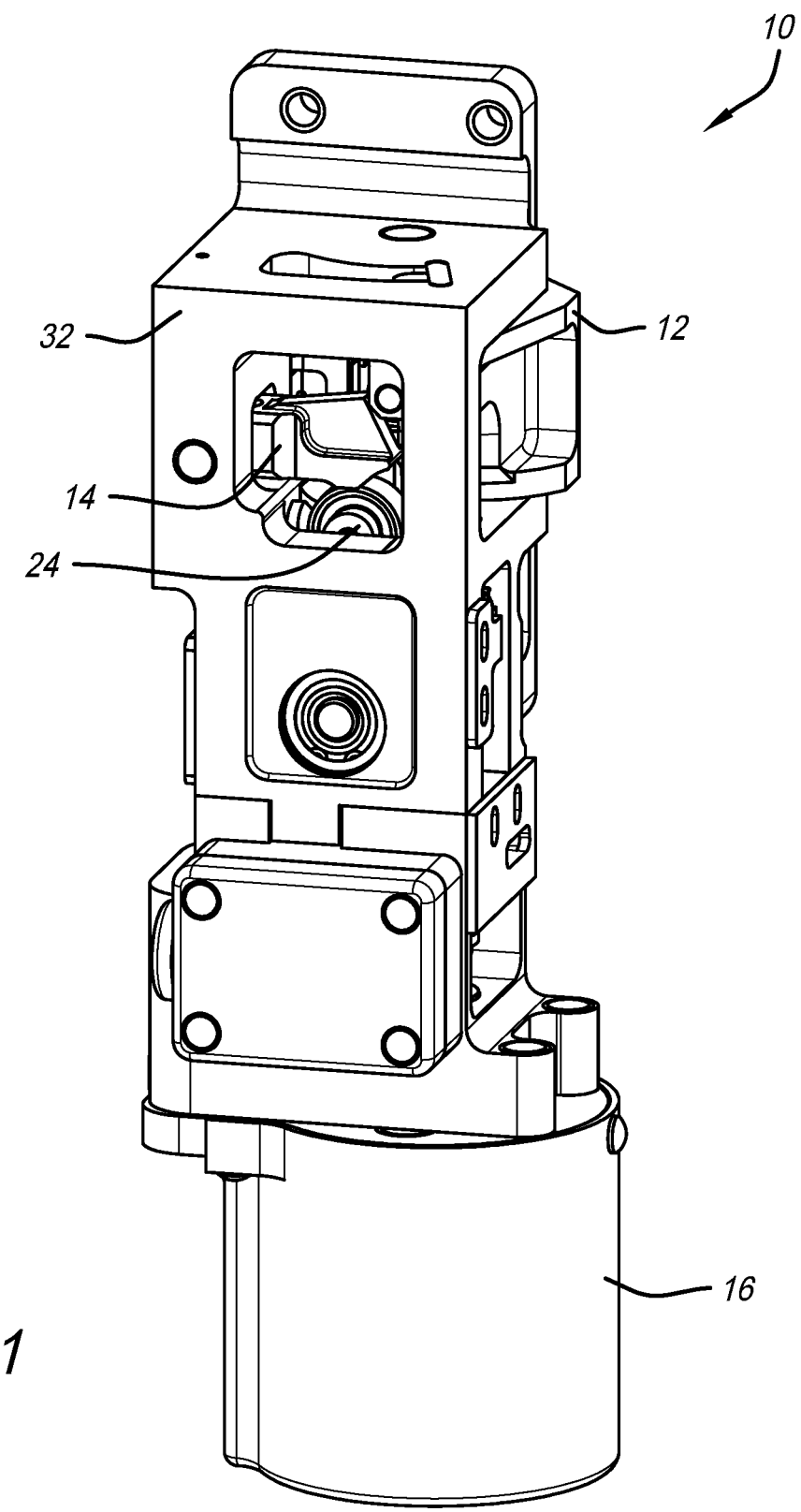
FIG. 1 is a perspective view of an electro-mechanical unlocking device in accordance with a preferred embodiment of the present invention.
Figure 2:
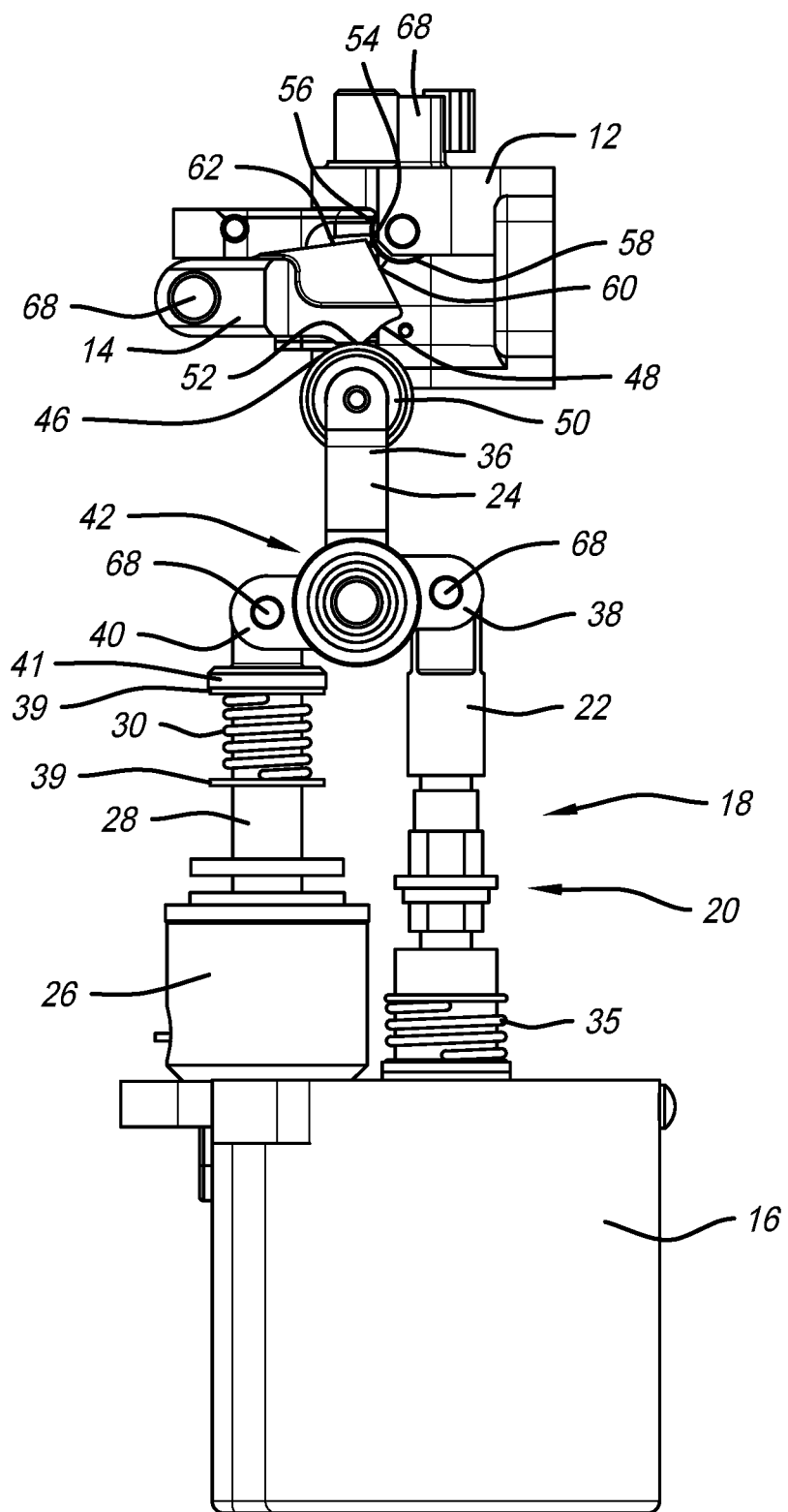
FIG. 2 is a front elevational view of the electro-mechanical unlocking device of FIG. 1 in the locking position and with the frame removed.
Figure 3:
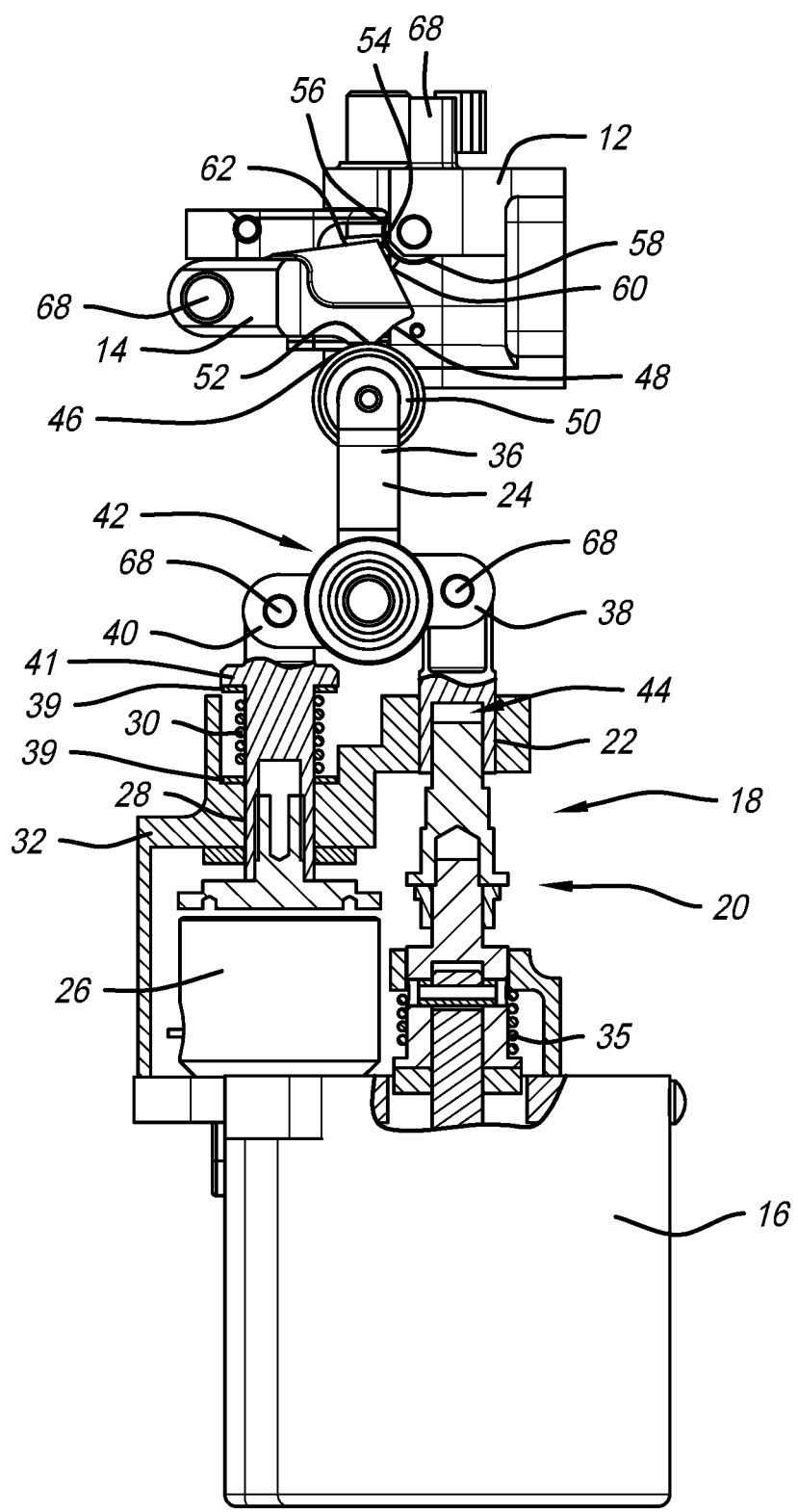
FIG. 3 is a front elevational view of the electro-mechanical unlocking device of FIG. 1 in the holding position and with a portion in cross-section.
Figure 4:
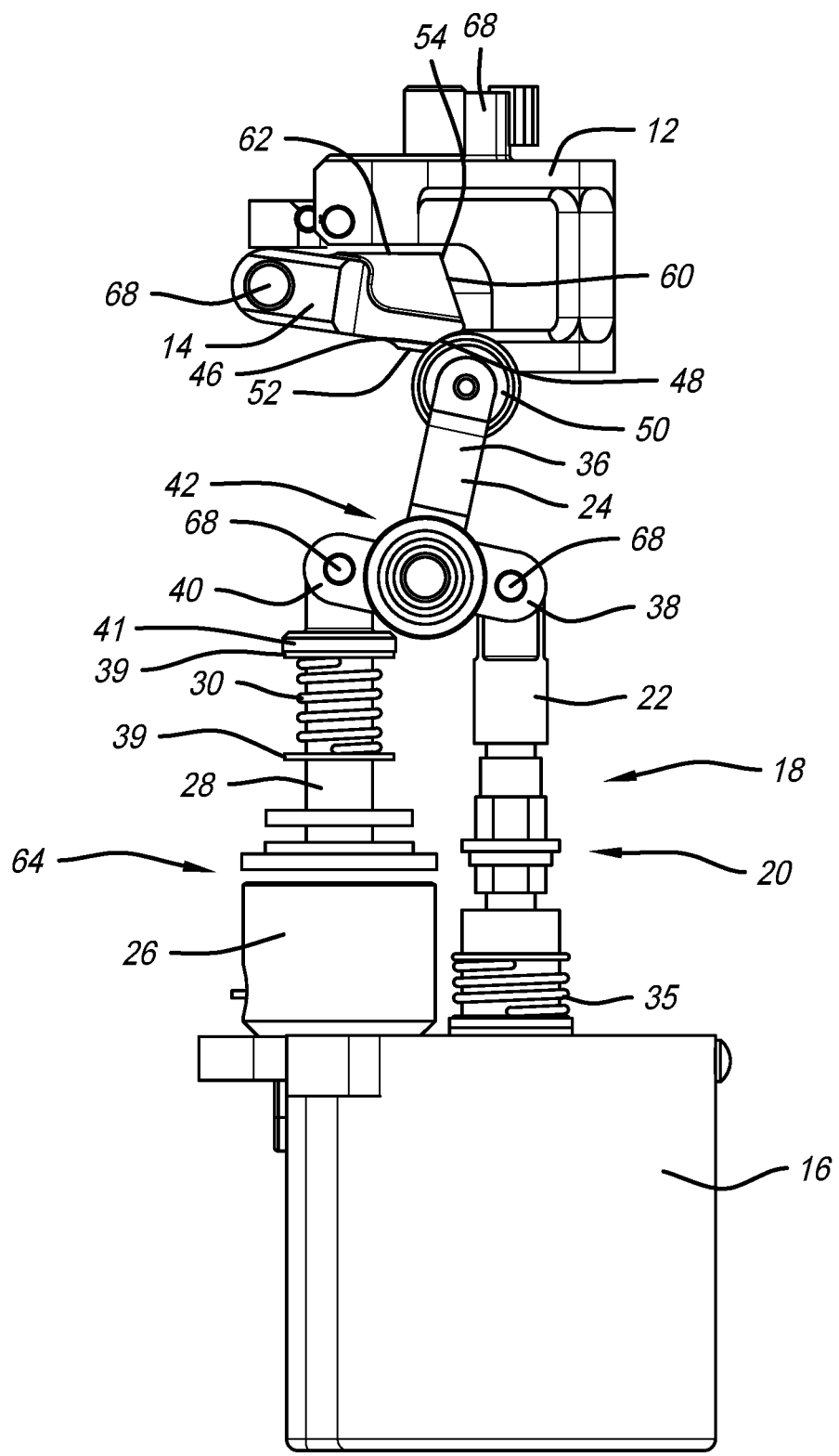
FIG. 4 is a front elevational view of the electro-mechanical unlocking device of FIG. 1 in the unlocking position and with the frame removed.
Figure 5:
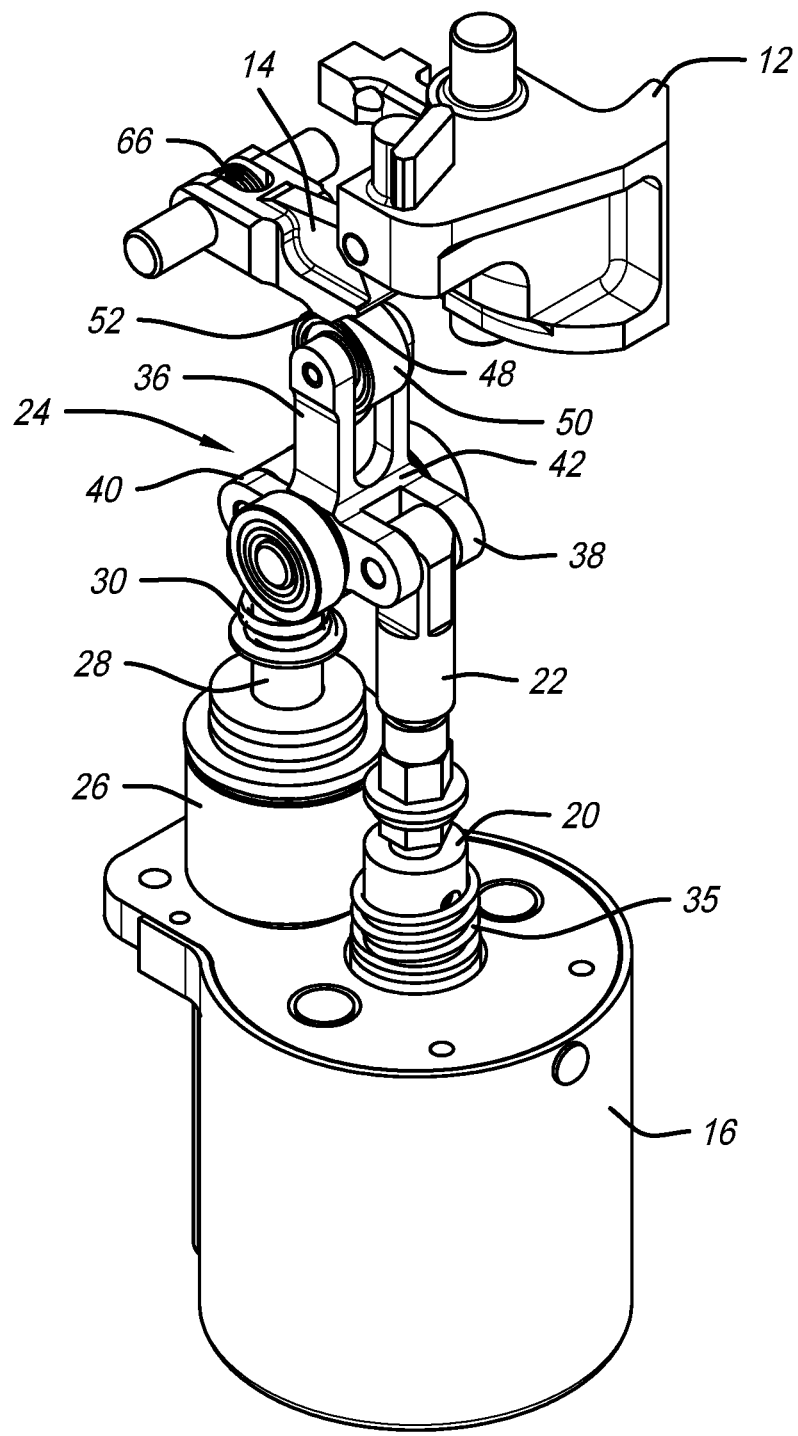
FIG. 5 is a perspective view of the electro-mechanical unlocking device of FIG. 1 in the locking position and with the frame removed.

Referring now to the drawings, which are for purposes of illustrating the present invention and not for purposes of limiting the same, FIGS. 1-7 show an electro-mechanical unlocking device 10 that can be used in an aircraft when a decompression event occurs. As the principal function of the electro-mechanical unlocking devices is to unlock or move the striker to the unlocked position, the electro-mechanical unlocking device 10 is often referred to herein as an unlocking device 10. The unlocking device 10 includes a locking or locked state (FIG. 2), a holding state (FIG. 3) and an unlocking or unlocked state (FIG. 4). The unlocking device 10 also includes a locking sequence, which places the unlocking device 10 in the locking or locked state, a holding sequence that places the unlocking device 10 in the holding sequence and an unlocking sequence that places the unlocking device 10 in the unlocking or unlocked state.

As shown in FIGS. 1-7, the unlocking device 10 generally includes a striker 12 that is movable between a first, locked or locking position and a second, unlocked or unlocking position, a sear 14 that is movable between a first position and a second position, an arming solenoid 16 that includes an energized state and a non-energized state, an arming assembly 18 that includes an arming armature 20 and an arming link 22, a crank 24 that is movable between a first position and a second position, a holding solenoid 26 that includes an energized state and a non-energized state, a holding armature 28 that is movable from a first position to a second position, and an unlock spring 30. In a preferred embodiment all of these components are held or positioned within a frame 32 that provides a base for the necessary pivot points of some of the components and allowing the components to move between the first and second positions.

Figure 6:
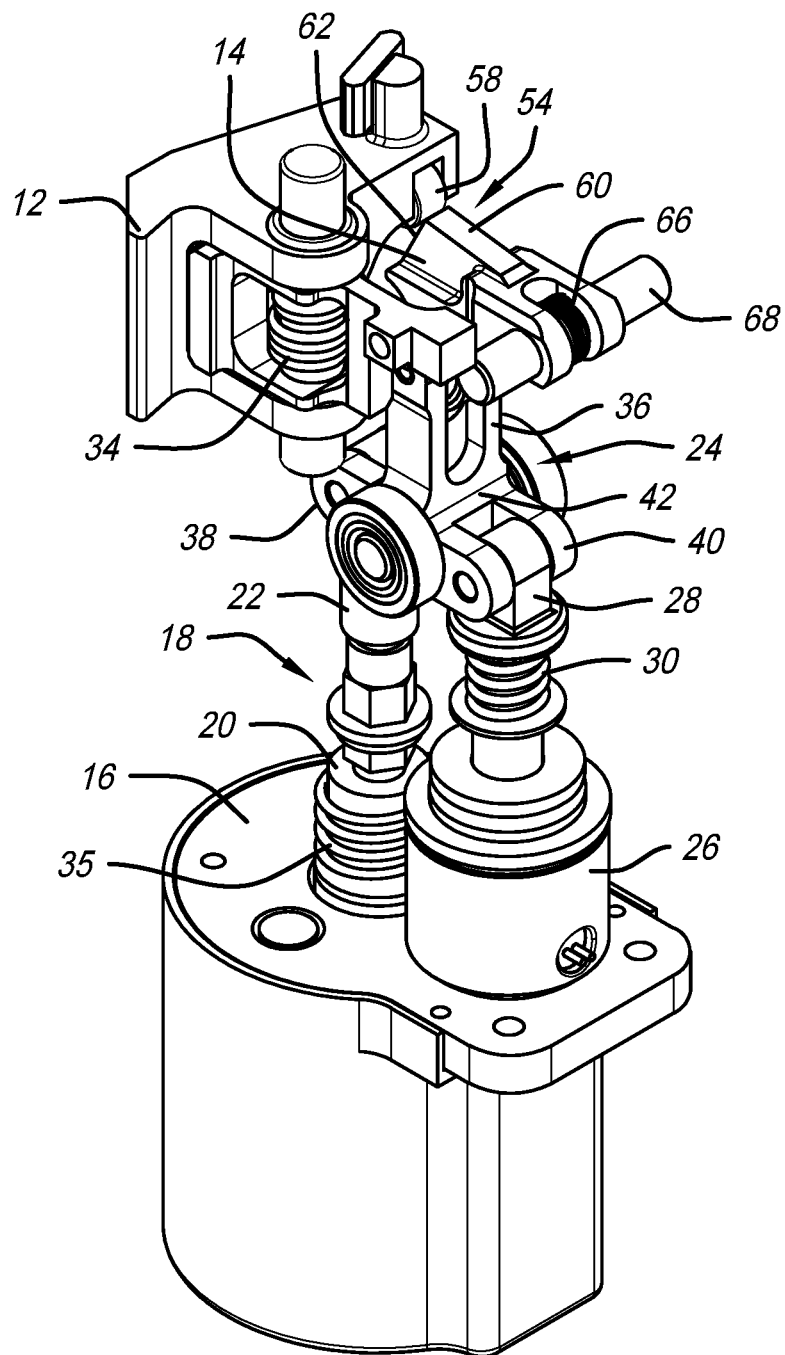
FIG. 6 is another perspective view of the electro-mechanical unlocking device of FIG. 1 in the locking position and with the frame removed.
Figure 7:
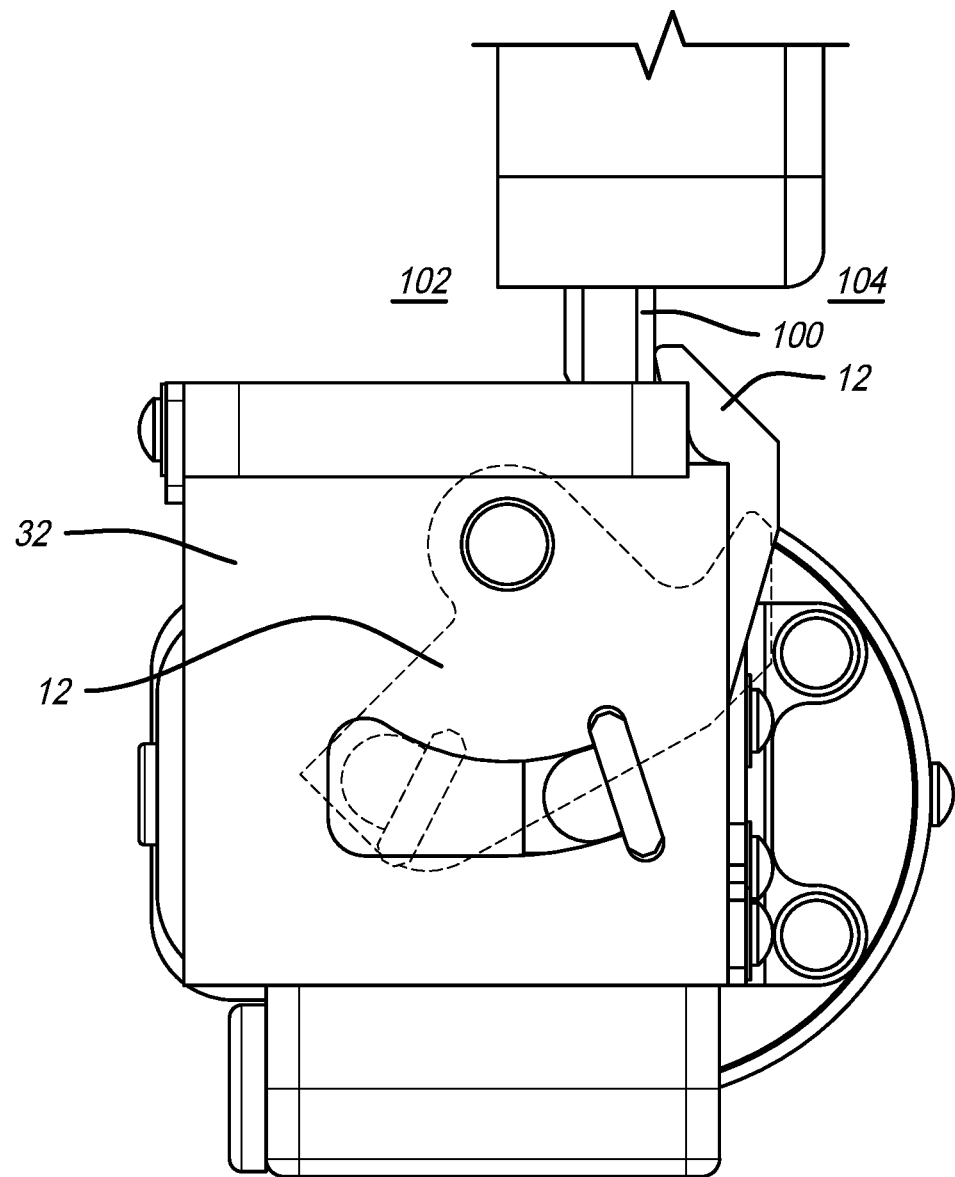
FIG. 7 is a top elevational view of the electro-mechanical unlocking device of FIG. 1 showing the striker in the first position and the second position.

In a preferred embodiment, the striker 12 is biased to the first position. For example, a spring 34 can be used to bias the striker 12, as shown in FIG. 6. In use, the striker 12 is configured to maintain a latch bolt 100 in a normal position when the striker is in the first or locked position. FIG. 7 shows the striker 12 in both the first position (solid lines) and second position (dashed lines). It will be appreciated that the latch bolt 100 shown in FIG. 7 is only exemplary. In use in an aircraft, the unlocking device 10 is used to release something when a decompression event occurs. Therefore, latch bolt or "decompression panel" is used herein generically to be any panel, latch bolt, wall, door, separating member or component thereof that separates two volumes (see first and second volumes 102 and 104 in FIG. 7) and moves or opens so that it no longer separates the two volumes when a decompression event occurs.

In a preferred embodiment, the sear 14 is biased to the second position. When the sear 14 is in the first position, the sear 14 blocks the striker or maintains the striker 12 in the first position, as shown in FIGS. 2 and 3. The arming armature 20 is movable between a first position and a second position and is biased to the second position. For example, a spring 35 can be used to bias the arming armature 20. The arming link 22 is movable between a first position and a second position.

In a preferred embodiment, the crank 24 is biased to the second position, as shown in FIG. 4. In a preferred embodiment, unlock spring 30 biases the crank 24 to the second position. Unlock spring 30 is installed on and is co-axial with connecting rod or holding armature 28. In an exemplary embodiment, the unlock spring 30 is preloaded to about 19 LBF when in the armed condition, and about 6 LBF in the unarmed condition, with a total travel of about 0.100". However, these numbers are only exemplary and not limiting. In a preferred embodiment, the unlock spring extends between a flange 41 on the holding armature 28 and a portion of the frame 32. The compression and loading of the spring is preferably controlled by washers and shims (see components 39 in FIG. 3). Preferably, the crank 24 is pivotable between the first position and the second position. In a preferred embodiment, the crank 24 includes a first arm 36, a second arm 38 and a third arm 40 that meet at a pivot portion 42 that is pivotably connected to the frame. The distal end of the first arm 36 contacts the sear 14, the second arm 38 is pivotably connected to the arming link 22, and the third arm 40 is pivotably connected to the holding armature 28.

In use, movement of the arming link 22 (and the entire arming assembly 18) from the second position to the first position moves the crank 24 from the second position to the first position. Movement of the crank 24 from the second position to the first position compresses the unlock spring 30 and moves the holding armature 28 from the second position to the first position. Unlock spring 30 bears against the flange 41 on the connecting rod 28, and also against the frame 32. The preload is controlled by the washers 39 at each end of the spring as well as shims, added or subtracted to achieve the load required for returning the crank 24 in the required time after the holding solenoid 26 is de-energized. As the crank 24 is rotated by the arming solenoid 16 the unlock spring 30 is compressed as the holding armature 28 makes contact with the holding solenoid 26.

As discussed above, the unlocking device includes a locking sequence, a holding sequence and an unlocking sequence. The locking sequence will now be described. FIG. 4 shows the unlocking device in the unlocked position and FIG. 2 shows the device in the locking position. In the locking sequence, the arming solenoid 16 switches to the energized state. When the arming solenoid 16 is switched to the energized state, the arming armature 20, arming link 22 move together from the second position to the first position. The arming assembly 18 moves the crank 24 from the second position to the first position. The crank 24 compresses the unlock spring 30, which moves the holding armature 28 from the second position to the first position. The holding solenoid 26 switches to the energized state and maintains the holding armature 28 in the first position. The crank 24 moves the sear 14 from the second position to the first position, and the sear blocks the striker 12 from moving from the first position to the second position. The unlocking device 10 is now locked.

In a preferred embodiment, pivoting of the crank 24 from the second position to the first position compresses the unlock spring 30 and moves the holding armature 28 linearly from the second position to the first position. Preferably, the sear 14 is pivotable between the first position and the second position. Preferably, the distal end of the first arm 36 of the crank 24 includes a curved surface 46 that is associated or in contact with a crank interaction surface 48 on the sear 14. When the crank 24 pivots from the second position to the first position the curved surface 46 pushes on the crank interaction surface 48 (which is preferably an inclined surface) and pivots the sear 14 from the second position to the first position. In a preferred embodiment, the curved surface 46 is a portion of a crank wheel 50 that is rotatably disposed on and a part of the first arm 36. It will be appreciated that in an exemplary embodiment, the crank wheel 50 includes a cres outer sleeve, pressed over an aluminum spacer with a needle bearing at its center. This allows the crank 24 to rotate from the first position to the second position under heavy load against the sear with minimal friction to achieve the exemplary 3 ms reaction requirement. In the first position, the crank wheel 50 (curved surface 46 or distal end of the first arm 36) contact a holding surface 52 of the sear to maintain the sear 14 in place. An angle is formed between the holding surface 52 and the crank interaction surface 48.

In a preferred embodiment, the sear 14 includes a striker interaction portion 54 and the striker includes a curved surface 56 that is associated with the striker interaction portion 54. When the sear 14 is in the first position, the striker interaction portion 54 (and, specifically, the lock surface 62 thereof) interacts with, is in contact with or blocks from movement the curved surface 56 on the striker 12. Preferably, the curved surface is part of a striker wheel 58 that may roll or slides on an unlock surface 60 when the sear 14 is in the second position.

Next, the holding sequence will be described. The holding sequence, position or state is shown in FIG. 3. In the holding sequence, the arming solenoid 16 switches to the de-energized state. When the arming solenoid 16 switches to the de-energized state, the arming armature 20 moves from the first position to the second position, thereby opening a gap 44 within the arming link 22 (as shown in FIG. 3) and between the arming armature and the arming link. The unlocking device 10 is now holding. This is the position the device will normally be in during operation of the aircraft. In a preferred embodiment, spring 35 moves the arming armature 20 to the second position when the arming solenoid 16 de-energizes, thus opening the gap 44. In this position, the sear 14 is in the first position and blocks movement of the striker 12 so the door cannot be opened.

Next, the unlocking sequence will be described. The unlocking sequence, position or state is shown in FIG. 4. In the unlocking sequence, the holding solenoid 26 switches to the de-energized state. When the holding solenoid 26 switches to the de-energized state the holding armature 28 moves from the first position to the second position and opens a gap 64. The unlock spring 30 moves the crank 24 from the first position to the second position. The sear 14 moves from the first position to the second position, thus unblocking the striker 12 and allowing the striker to move as a result of a decompression event or a person opening the door. It will be appreciated that the in moving the striker from the first to the second position to allow the door open, the force of spring 34 is overcome.

In a preferred embodiment, pivotal movement of the crank 24 from the first position to the second position moves the arming link 22 linearly from the first position to the second position. When the crank pivots 24 from the first position to the second position, the crank wheel 50 moves or rolls off of the holding surface 52. As a result, because the sear 14 is biased to the second position (e.g., see spring 66 in FIG. 5), the sear 14 pivots to the second position. As the sear 14 pivots to the second position, the striker 12 is unblocked so it can move between first and second positions. In a decompression event the pressure pushes the latch bolt past the striker to open the door or other decompression panel.

It will be appreciated that some or all of the pivot points include pivot pins or pivot members 68 and the components that are biased may include a spring on or associated with the pivot pin or a pivot member.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples and are not limiting: alternative implementations may employ differing values, measurements or ranges.

Any patents and applications and other references noted above, including any that may be listed in accompanying filing papers, are incorporated herein by reference in their entirety.

What is claimed is:

1. An electro-mechanical unlocking device comprising:
a striker that is movable between a first position and a second position, wherein the striker is configured to maintain a decompression panel in a normal position when the striker is in the first position,
a sear that is movable between a first position and a second position, wherein the sear is biased to the second position, wherein the sear maintains the striker in the first position when the sear is in the first position,
an arming solenoid that includes an energized state and a non-energized state,
an arming assembly that includes an arming armature and an arming link, wherein the arming armature is movable between a first position and a second position, wherein the arming link is movable between a first position and a second position, and wherein the arming armature is biased to the second position,
a crank that is movable between a first position and a second position, wherein the crank is biased to the second position, wherein movement of the arming link from the second position to the first position moves the crank from the second position to the first position,
a holding solenoid that includes an energized state and a non-energized state,
a holding armature that is movable from a first position to a second position,
an unlock spring, wherein movement of the crank from the second position to the first position compresses the unlock spring and moves the holding armature from the second position to the first position,
wherein the electro-mechanical unlocking device includes a locking state, a holding state and an unlocking state,
wherein in the locking state, the arming solenoid switches to the energized state, when the arming solenoid is switched to the energized state, the arming armature and arming link move together from the second position to the first position, the arming assembly moves the crank from the second position to the first position, the crank compresses the unlock spring, which moves the holding armature from the second position to the first position, the holding solenoid switches to the energized state and maintains the holding armature in the first position, and the crank moves the sear from the second position to the first position, whereby the crank blocks movement of the striker from the first position to the second position,
wherein in the holding state, the arming solenoid switches to the de-energized state, when the arming solenoid switches to the de-energized state the arming armature moves from the first position to the second position, thereby opening a gap between a portion of the arming armature and a portion of the arming link, and
wherein in the unlocking state, the holding solenoid switches to the de-energized state, when the holding solenoid switches to the de-energized state the holding armature moves from the first position to the second position, the unlock spring moves the crank from the first position to the second position, and the sear moves from the first position to the second position, thereby unblocking the striker.

2. The electro-mechanical unlocking device of claim 1 wherein the crank is pivotable between the first position and the second position, wherein pivoting of the crank from the second position to the first position compresses the unlock spring and moves the holding armature linearly from the second position to the first position, and wherein movement of the crank from the first position to the second position moves the arming link linearly from the first position to the second position.

3. The electro-mechanical unlocking device of claim 2 wherein the crank includes first, second and third arms, wherein a distal end of the first arm contacts the sear, wherein the second arm is pivotably connected to the arming link, and wherein the third arm is pivotably connected to the holding armature.

4. The electro-mechanical unlocking device of claim 3 wherein the sear is pivotable between the first position and the second position, wherein the distal end of the first arm of the crank includes a curved surface that is associated with a crank interaction surface on the sear, wherein when the crank pivots from the second position to the first position the curved surface pushes on the crank interaction surface and pivots the sear from the second position to the first position.

5. The electro-mechanical unlocking device of claim 4 wherein the sear includes a striker interaction portion, wherein the striker includes a curved surface that is associated with the striker interaction portion, wherein when the sear pivots from the second position to the first position the striker is free to pivot between the first and second positions.

6. The electro-mechanical unlocking device of claim 5 wherein the curved surface of the first arm of the crank is a portion of a crank wheel, wherein when the crank moves from the first position to the second position the crank wheel rotates against the sear.

7. The electro-mechanical unlocking device of claim 1 wherein the sear defines a sear pivot axis and the striker defines a striker pivot axis, and wherein the striker pivot axis and sear pivot axis are perpendicular to one another.

8. The electro-mechanical unlocking device of claim 1 wherein an end of the arming armature is received in an opening defined in the arming link, and wherein in the holding state the gap is defined between the end of the arming armature and an inner surface of the arming link.

9. The electro-mechanical unlocking device of claim 1 wherein the striker includes a striker wheel and the sear includes an unlock surface, wherein when the sear is in the first position, the striker wheel contacts the unlock surface to block the striker from moving between the first and second positions.

\* \* \* \* \*